United States Patent
Estevo, Jr. et al.

(10) Patent No.: US 10,209,065 B2
(45) Date of Patent: Feb. 19, 2019

(54) DETACHABLE PROTECTIVE COVERINGS AND PROTECTION METHODS

(71) Applicant: THE BOEING COMPANY, Chicago, IL (US)

(72) Inventors: Curtis R. Estevo, Jr., Mesa, AZ (US); Basilio Penuelas, Mesa, AZ (US); Jason G. DeStories, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/887,634

(22) Filed: Feb. 2, 2018

(65) Prior Publication Data

US 2018/0188024 A1 Jul. 5, 2018

Related U.S. Application Data

(62) Division of application No. 14/543,652, filed on Nov. 17, 2014, now Pat. No. 9,915,527.

(51) Int. Cl.
   *G01B 21/16* (2006.01)
   *B25J 19/02* (2006.01)

(52) U.S. Cl.
   CPC .......... *G01B 21/16* (2013.01); *B25J 19/026* (2013.01); *B25J 19/027* (2013.01)

(58) Field of Classification Search
   CPC ........ G01B 21/16; B25J 19/026; B25J 19/027
   See application file for complete search history.

(56) References Cited

U.S. PATENT DOCUMENTS

| | | | |
|---|---|---|---|
| 7,017,195 B2 | 3/2006 | Buckman et al. | |
| 7,194,358 B2 * | 3/2007 | Callaghan | B66B 5/0031 182/112 |
| 7,869,305 B2 * | 1/2011 | Anderson | B60Q 1/48 367/909 |
| 8,708,282 B2 * | 4/2014 | Helou, Jr. | B64C 1/00 244/118.2 |
| 9,193,573 B1 * | 11/2015 | Troy | B66F 7/065 |
| 9,327,953 B2 * | 5/2016 | Sayles | B66F 17/006 |
| 9,915,527 B2 * | 3/2018 | Estevo, Jr. | G01B 21/16 |
| 2003/0212335 A1 * | 11/2003 | Huang | A61B 5/021 600/500 |
| 2005/0174246 A1 * | 8/2005 | Picco | G01M 3/04 340/604 |
| 2006/0066470 A1 * | 3/2006 | Anderson | B60Q 1/48 342/29 |
| 2007/0068931 A1 * | 3/2007 | Augustine | A61F 7/007 219/549 |
| 2008/0202912 A1 * | 8/2008 | Boddie | H03K 17/962 200/600 |

(Continued)

*Primary Examiner* — Laura M Menz
(74) *Attorney, Agent, or Firm* — Toler Law Group, P.C.

(57) ABSTRACT

A detachable hazard detection device includes a protective covering configured to detachably couple to an article. A plurality of proximity sensors are coupled to the protective covering. Each of the plurality of proximity sensors is configured to gather proximity information. Electronics are embedded in the protective covering, and the electronics include a controller coupled to the plurality of proximity sensors. The controller is configured to determine a proximity of the article to an object based on the proximity information. The controller is further configured to initiate a notification based on the proximity.

20 Claims, 6 Drawing Sheets

(56) References Cited

U.S. PATENT DOCUMENTS

| | | | | |
|---|---|---|---|---|
| 2009/0151454 A1* | 6/2009 | Georgeson | ............... | G01B 7/14 |
| | | | | 73/583 |
| 2011/0001629 A1* | 1/2011 | Van Doorn | ............ | A47C 31/10 |
| | | | | 340/686.1 |
| 2012/0032906 A1* | 2/2012 | Lemmens | ............... | G06F 3/011 |
| | | | | 345/173 |
| 2016/0138913 A1* | 5/2016 | Estevo, Jr. | ............. | G01B 21/16 |
| | | | | 702/150 |
| 2016/0320777 A1* | 11/2016 | Yun | ...................... | G05D 1/0238 |
| 2016/0375910 A1* | 12/2016 | McMillen | ......... | B60W 50/0098 |
| | | | | 701/36 |
| 2018/0099607 A1* | 4/2018 | Salter | ........................ | B60Q 3/20 |
| 2018/0336786 A1* | 11/2018 | Salter | ..................... | G08G 1/166 |

* cited by examiner

DETACHABLE PROTECTIVE COVERINGS AND PROTECTION METHODS

CROSS REFERENCE TO RELATED APPLICATIONS

This application claims priority from, and is a divisional application of, U.S. patent application Ser. No. 14/543,652, filed on Nov. 17, 2014, which is incorporated herein by reference in its entirety.

FIELD OF THE DISCLOSURE

The present disclosure relates to protective coverings.

BACKGROUND

During manufacturing or production activities, parts, assemblies, sensitive materials, and people may come into close proximity to hazards. For example, when moving a large item through a production area, the item may collide with an object, thereby damaging the item. To mitigate the risks of damage, the item may be protected with coverings, cases, or guards. However, these mitigation techniques only provide protection when the item actually contacts or collides with the object. Despite use of the covering, case, or guard, the item may be damaged due to collision with the object. Furthermore, in the case of a large item, adequate protection via coverings, cases, or guards over the entire surface area of the item is typically not feasible. Additionally, where hazards are extreme or the item to be protected is very sensitive, adequate protection from hazards (e.g., collision) may not be feasible.

SUMMARY

In a particular embodiment, a detachable hazard detection device includes a protective covering configured to detachably couple to an article. Proximity sensors are coupled to the protective covering. Each of the proximity sensors is configured to gather proximity information. Electronics are embedded in the protective covering. The electronics include a controller coupled to the proximity sensors. The controller is configured to determine a proximity of the article to an object based on the proximity information. The controller is further configured to initiate a notification based on the proximity.

In a particular embodiment, a method includes, while a protective covering is detachably coupled to a first article, gathering proximity information using proximity sensors coupled to the protective covering and using electronics embedded in the protective covering. The method includes determining a proximity of the first article to an object based on the proximity information. The method includes initiating a notification based on the proximity.

The features, functions, and advantages that have been described can be achieved independently in various embodiments or may be combined in yet other embodiments, further details of which are disclosed with reference to the following description and drawings.

DETAILED DESCRIPTION

Particular embodiments disclosed herein include a detachable hazard detection device that includes one or more protective coverings configured to detachably couple to an article to be protected. The one or more protective coverings include components coupled thereto to detect or determine a range or proximity to potential hazards, and to initiate a notification based on the determined range or proximity. The notification may be audible, visible, or haptic. Initiation of the notification may include transmitting proximity information to a computer. The notification may warn a user that the article is in danger of exposure to a hazard (e.g., collision with an object), thereby enabling the user to take action to prevent exposure of the article to the hazard (e.g., to prevent the collision).

Particular embodiments of the present disclosure are described below with reference to the drawings. In the description, common features are designated by common reference numbers throughout the drawings.

Figure 1:
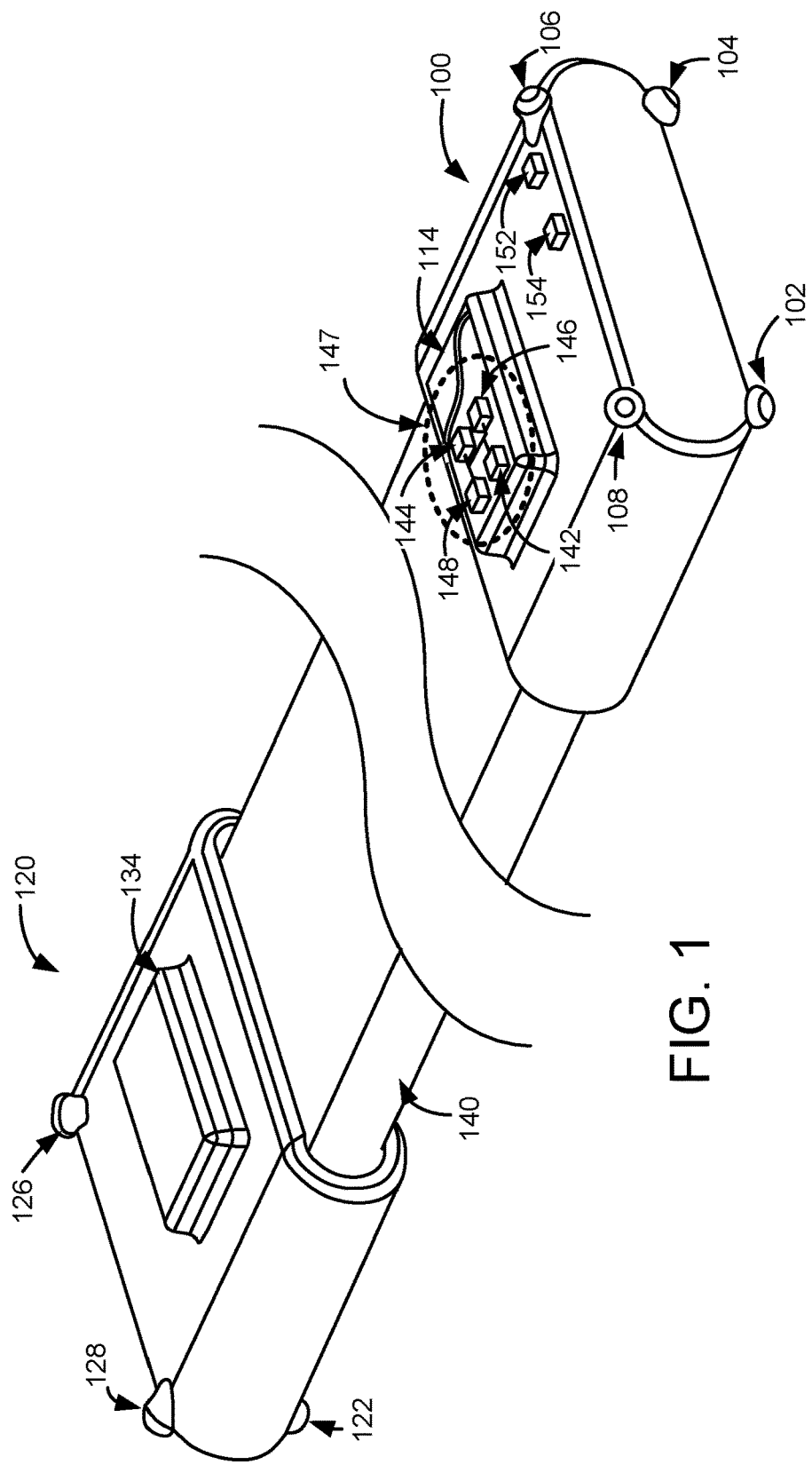
FIG. 1 is a perspective view of a particular embodiment of protective coverings detachably coupled to a particular article.

Referring to FIG. 1, a particular embodiment of a detachable hazard detection device is depicted. The detachable hazard detection device includes one or more protective coverings, such as one or more protective coverings 100 or 120. Each of the one or more protective coverings 100, 120 is configured to detachably couple to an article 140. The article 140 may be any article. For example, the article 140 may be an article to be moved during a manufacturing, production, or assembly process. In some embodiments, the article 140 includes a part, a component, or material of a helicopter rotor, such as a rotor body, a rotor blade, or a combination or portion thereof.

As used herein, "configured to be detachably coupled" refers to the one or more protective coverings 100, 120 being configured or manufactured to be removed, separated, decoupled, or detached from the article 140 without damaging or destroying the one or more protective coverings 100, 120, the article 140, and/or any components, parts, or assemblies to which the article 140 or the one or more protective coverings 100, 120 are coupled. The one or more protective coverings 100, 120 may be detachably coupled to the article 140 without assembling and/or disassembling the one or more protective coverings 100, 120, the article 140, or any components, parts, or assemblies to which the article 140 is, will be, or has been, coupled. In some embodiments, the one or more protective coverings 100, 120 include a protective sleeve. However, in other embodiments, the one or more protective coverings 100, 120 include a protective film, wrap, or other form of a protective covering.

In some examples, the one or more protective coverings 100, 120 are configured to detachably couple to the article 140 by friction contact. For example, the one or more protective coverings 100, 120 may be dimensioned to snugly couple to, or mount on, the article 140 such that one or more portions of an inner surface of the one or more protective coverings 100, 120 is in contact with one or more portions of the article 140. The one or more portions of the inner surface of the one or more protective coverings 100, 120 that are in contact with the one or more portions of the article 140 may experience a friction-contact force that opposes sliding motion between the surfaces, thereby preventing the one or more protective coverings 100, 120 from sliding off the article 140 without application of an external force (e.g., a person or machine pulling on the one or more protective coverings 100, 120). Alternatively or in addition to the friction contact force, in some examples, the one or more protective coverings 100, 120 may be detachably coupled to the article 140 using one or more fasteners, such as one or more magnets, one or more pins (e.g., a split pin), one or more clips (e.g., an R-clip), clamps, or a fabric hook and loop fastener (e.g., velcro).

In some embodiments, the one or more protective coverings 100, 120 are formed of or include a deformable (e.g., elastic) material. In some embodiments, the one or more protective coverings 100, 120 are formed of or include foam, rubber, clay (e.g., modeling clay or metal clay), silicone, a ceramic (e.g., porcelain), a metal (e.g., steel or aluminum), a metal alloy, a composite (e.g., cermet, a metal matrix composite or a ceramic matrix composite), a powder (e.g., a thermoplastic powder, a metal powder, a ceramic powder), plaster, paper, plastic (e.g., a plastic film or a thermoplastic material), or a photopolymer. In some examples, the one or more protective coverings 100, 120 are formed using a 3D printing or additive manufacturing process. For example, the one or more protective coverings 100, 120 may be formed using an extrusion deposition process, a lamination process, selective fusing, or a combination thereof. In some embodiments, the one or more protective coverings 100, 120 include padding to absorb impact energy in the event of a collision with the object.

The one or more protective coverings 100, 120 include a plurality of proximity sensors coupled to each of the one or more protective coverings 100, 120. For example, first proximity sensors 102, 104, 106, and 108 may be coupled to the first protective covering 100, and second proximity sensors 122, 126, 128, and another sensor [not illustrated due to perspective of illustration] may be coupled to the second protective covering 120. In some embodiments, the first proximity sensors 102, 104, 106, or 108 may be embedded into the first protective covering 100, and the second proximity sensors (122, 126, 128, and the other sensor) may be embedded into the second protective covering 120. Each of the first proximity sensors 102, 104, 106, and 108 may be coupled to, or embedded into, the first protective covering 100 using an adhesive (e.g., the sensors may be adhered to the protective covering), by screwing the sensor into the first protective covering 100, or by pressing the sensors into the first protective covering 100. Likewise, each of the second proximity sensors (122, 126, 128, and the other sensor) may be coupled to, or embedded into, the second protective covering 120 using an adhesive, by screwing the sensor into the second protective covering 120, or by pressing the sensor into the second protective covering 120. For example, one or more of the first proximity sensors 102, 104, 106, or 108 may include a cylindrical or conical portion. The cylindrical or conical portion may include a helical ridge (e.g., a male thread). The first protective covering 100 may include one or more holes at least partially lined by internal threads (e.g., a female thread). The first proximity sensors 102, 104, 106, or 108 may be coupled to the first protective covering 100 by screwing the sensors into corresponding threaded holes in the first protective covering 100.

The one or more first proximity sensors 102, 104, 106, or 108 and the second proximity sensors (122, 126, 128, and the other sensor) may be configured to gather proximity information. The proximity information may be in the form of signals or energy from which range or proximity to an object can be deduced or determined. In some examples, the first proximity sensors 102, 104, 106, or 108 and the second proximity sensors (122, 126, 128, and the other sensor) may include one or more passive proximity sensors. Alternatively or additionally, the first proximity sensors 102, 104, 106, or 108 and the one or more second proximity sensors (122, 126, 128, and the other sensor) may include one or more active proximity sensors. In some embodiments, the first proximity sensors 102, 104, 106, or 108 and the second proximity sensors (122, 126, 128, and the other sensor) include sonic (e.g., ultrasonic) proximity sensors that are configured to gather proximity information by using sonic signals to determine a range or proximity to the object. Alternatively or additionally, the first proximity sensors 102, 104, 106, or 108 and the second proximity sensors (122, 126, 128, and the other sensor) may include electromagnetic (e.g., infrared) sensors that are configured to gather proximity information by using electromagnetic signals to determine a range or proximity to the object.

Active proximity sensors may be configured to emit signals and to gather return signals reflected or diffracted from objects positioned in a detection region of the active proximity sensors. For example, for the proximity sensor 102 that is an active proximity sensor, the proximity sensor 102 may include a transmit element (e.g., a transmit transducer) to convert an electrical signal (e.g., a drive or excitation signal) provided to the transmit element into a transmit signal (e.g., an electromagnetic or acoustic signal) and to emit the transmit signal. The emitted transmit signal may interact with (e.g., be reflected by) an object in the detection range of the proximity sensor 102 and a reflected signal is returned to the proximity sensor 102. The proximity sensor 102 may include a receive element (e.g., a receive transducer) configured to receive the reflected signal and to generate an electrical signal based on the reflected signal. The transmit element and the receive element of the proximity sensor 102 may be the same element (e.g., to both emit the transmit signal and receive the reflected signal). The reflected signal may be a delayed and/or a slightly distorted version of the transmit signal.

Each sensor of the first proximity sensors 102, 104, 106, 108 and the second proximity sensor (122, 126, 128, and the other sensor) may detect objects within a particular region (e.g., a detection region) and particular range (e.g., a detection range) of the sensor. When an object that the proximity sensor is capable of detecting is located in the detection region within the detection range of the proximity sensor, the proximity sensor may generate, gather, or provide (e.g., to a controller) proximity information. The controller may use the proximity information to determine the presence of the object in the detection region and/or to determine a range to the object. In some embodiments, at least one of the detection regions of the first proximity sensors 102, 104, 106, or 108 is not co-planar with at least one other detection region of the first proximity sensors 102, 104, 106, or 108. Detection regions are described in more detail with reference to FIG. 2.

Passive proximity sensors may be configured to gather or receive proximity information from a transmitter that is not coupled (e.g., not physically coupled) to the one or more protective coverings 100, 120. For example, for a proximity sensor 102 that is a passive sensor, the proximity sensor 102 may include a receive element, but not a transmit element. A transmitter disposed on an object may intermittently or continuously (when powered on) transmit a signal that may be gathered by the receive element of the proximity sensor 102. The received signal may be evaluated to determine a range or proximity to the object.

Electronics (e.g. "first electronics" 147) are coupled to, or embedded in, the first protective covering 100. Although the first electronics 147 are illustrated as including a power source 142 and a transmitter 148, in other embodiments, the first electronics 147 may not include one or both of the power source 142 or the transmitter 148. The power source 142 may be any form of power (e.g., electrical) supply, such as a battery. Electronics (e.g., "second electronics") [not illustrated] may be coupled to, or embedded in, the second protective covering 120. In some embodiments, the one or more protective coverings 100, 120 include one or more compartments, 114, 134 configured to house the electronics. The second electronics may include components corresponding to the first electronics 147, and the second electronics may operate as described with reference to the first electronics 147. In some embodiments, the second electronics operate independently of the first electronics 147. For example, as described below with reference to the first electronics 147, the second electronics may be configured to determine a range or proximity to an object using a second controller [not illustrated] embedded in, or coupled to, the second protective covering 120. The second electronics (e.g., the second controller) may determine the range or proximity based wholly on proximity information gathered by the second proximity sensors 122, 126, 128, and the other sensor. The second electronics may be configured to initiate a notification using a notification unit embedded in or coupled to the second protective covering 120 without interacting or communicating with any components located external to the second protective covering 120 (e.g., without communicating with the first protective covering 100).

The first electronics 147 or the second electronics may include a controller. For example, the first electronics 147 may include controller 144 coupled (e.g., electrically) to the one or more first proximity sensors 102, 104, 106, or 108. When the one or more first proximity sensors 102, 104, 106, or 108 include an active proximity sensor, the controller 144 may be configured to generate the electrical signal provided to the active proximity sensor (e.g., the drive or excitation signal). The controller 144 may additionally or alternatively be configured to receive (e.g., from the one or more first proximity sensors 102, 104, 106, or 108) electrical signals corresponding to (e.g., derived at least partially from), or generated by the one or more first proximity sensors 102, 104, 106, or 108 based on, the reflected signal(s) (e.g., proximity information) received by the one or more first proximity sensors 102, 104, 106, or 108. The controller 144 may be configured to determine a range or proximity to the object (e.g., "proximity data") based on the electrical signals received from the one or more first proximity sensors 102, 104, 106, or 108 (e.g., based on the proximity information). When the one or more first proximity sensors 102, 104, 106, or 108 include a passive sensor, the controller 144 may be configured to receive electrical signals corresponding to (e.g., derived at least partially from), or generated by the one or more first proximity sensors 102, 104, 106, or 108 based on, the received electrical signal(s) (that may include proximity information) received from a transmitter located external to the first protective covering 100, and to determine a range or proximity to the object (e.g., "proximity data") based on the electrical signals (e.g., based on the proximity information).

The controller 144 may be configured to determine whether the determined range or proximity to the object satisfies a threshold. In some examples, the threshold may be adjustable. For example, when an article is being slowly transported, or when the article is being transported in tight quarters, the threshold may be adjusted to less distance than when the article is being rapidly transported or is being transported in a more open environment. For example, the threshold may be set to one foot in tight quarters, while the threshold is set to two feet in an open environment. The controller 144 may be configured to output a notification control signal indicative of whether the determined range or proximity to the object satisfies the threshold. For example, the controller 144 may output a first notification control signal when the controller 144 determines that the determined range or proximity to the object satisfies the threshold. The controller 144 may not output a notification control signal when the range or proximity to the object does not satisfy the threshold. Alternatively or additionally, the controller 144 may output a second notification control signal when the range or proximity to the object does not satisfy the threshold.

In some embodiments, the notification control signal may be further indicative of a graduated range to the object. For example, the controller 144 may be configured to output different notification signals corresponding to particular ranges when the controller 144 determines that the range or proximity satisfies the threshold. For example, the threshold may correspond to a range or proximity of 5 feet, and the controller 144 may be configured to output a first graduated notification signal when the controller determines that the article 140 is between 4 and 5 feet away from the object, to output a second graduated notification signal when the controller determines that the article 140 is between 3 and 4 feet away from the object, and to output a third graduated notification signal when the controller 144 determines that the article 140 is closer than three feet away from the object.

The first electronics 147 and the second electronics may include a notification unit. For example, the first electronics 147 may include notification unit 146 coupled to the controller 144. The notification unit 146 may be configured to generate a notification based on the proximity information or the determined range or proximity. In some examples, the notification unit 146 may be an alarm device, and the notification may be audible, visual, or haptic. The notification unit 146 may be configured to generate the notification in response to the controller 144 determining that the article is within a predetermined range or proximity of the object (e.g., in response to the controller 144 determining that the range or proximity to the object satisfies the threshold). For example, the notification unit 146 may be configured to generate the notification in response to receiving the first notification control signal. As an example, when the notification includes an audible notification, the notification unit 146 may be configured to generate the audible notification (e.g., such as an audible tone) in response to receiving the first notification control signal (described above) from the controller 144. Alternatively or additionally, the notification unit 146 may be configured not to generate the audible notification when the notification unit 146 does not receive a notification control signal or when the notification unit 146 receives the second notification control signal (described above) from the controller 144.

The notification unit 146 may be configured to generate a graduated notification indicative of a distance to the object. For example, the notification unit 146 may be configured to generate a first graduated notification when the controller 144 determines that the range or proximity to the object satisfies the threshold and the range or proximity to the object is greater than a first distance. The notification unit 146 may be configured to generate a second graduated notification when the controller 144 object is less than the first distance away from the object. For example, the notification unit 146 may generate the first graduated notification in response to receiving the first graduated notification control signal from the controller 144 and may generate the second graduated notification in response to receiving the second graduated notification control signal from the controller 144.

At least one parameter of the first graduated notification may be different than at least one parameter of the second graduated notification. For example, when the first and second graduated notifications include audible notifications, the first audible graduated notification may include a plurality of beeps at a first frequency or interval, and the second audible graduated notification may include a plurality of beeps at a second frequency or interval that is different than the first frequency or interval. The first frequency or interval may be greater than the second frequency or interval such that the second audible graduated notification includes beeping that is more rapid than the first audible graduated notification. As another example, the first audible graduated notification may be a different amplitude than the second audible graduated notification. For example, the second audible graduated notification may be louder than the first audible graduated notification. As yet another example, the first audible graduated notification may be at a different frequency than the second audible graduated notification. For example, the second audible graduated notification may include a tone at a higher frequency than at least one tone of the first audible graduated notification. Thus, the notification may indicate a proximity of the article 140 to the object.

When the notification includes a visible notification, the notification unit 146 may include a display unit to convey range or proximity information to a user. In some examples, the visible notification may include particularly colored flashing lights. For example, the notification unit may include an LED display to display a flashing light when the controller 144 determines that the range or proximity satisfies the threshold as described above. Alternatively or additionally, the display unit may include a display (e.g., a second display) that indicates a range to a nearest object. The visible notification may include graduated notifications (e.g., visible graduated notifications). For example, when the first and second graduated notifications include visible notifications, the first visible graduated notification may include one or more lights that flash at a first frequency or interval, and the second visible graduated notification may include one or more lights that flash at a second frequency or interval that is different than the first frequency or interval. The first frequency or interval may be greater than the second frequency or interval such that the second visible graduated notification includes flashing that is more rapid than the first visible graduated notification. As another example, the first visible graduated notification may be a different intensity than the second visible graduated notification. For example, the second visible graduated notification may be brighter than the first visible graduated notification. As yet another example, the first visible graduated notification may include a different color than the second visible graduated notification. For example, the second visible graduated notification may include a red light and the first visible graduated notification may include a yellow light. Thus, the visible notification may indicate a proximity of the article 140 to the object.

The notification may include a haptic notification. When the notification includes a haptic notification, the notification unit 146 may include a motor configured to induce vibrations. In some examples, the notification unit may be configured to activate the haptic notification (e.g., to initiate the motor) when the controller 144 determines that the range or proximity satisfies the threshold as described above. The haptic notification may include graduated notifications (e.g., haptic graduated notifications). For example, when the first and second graduated notifications include vibrational notifications, the first vibrational graduated notification may vibrate at a first intensity and the second vibrational graduated notification may vibrate a second intensity that is different than the first intensity. Thus, the haptic notification may indicate a proximity of the article 140 to the object.

The one or more protective coverings 100, 120 may include an impact sensor. For example, the first protective covering 100 may include an impact sensor 152. The impact sensor 152 may be configured to determine whether the article 140 has collided with an object. The impact sensor 152 may be any impact sensor configured to determine whether the article 140 has experienced a collision with the object. For example, the impact sensor 152 may be an inertial sensor, such as a g-switch or threshold accelerometer. The impact sensor 152 may be configured to collect information (e.g., "impact information") indicative of whether the article 140 has experienced a collision. Alternatively or additionally, the impact sensor 152 may be configured to provide the impact information to the controller 144 which may store and/or process the impact information.

The one or more protective coverings 100, 120 may include a location unit. For example, the first protective covering 100 may include location unit 154 to determine a location (e.g., location information) of the first protective covering 100, the article 140, or both. The location unit 154 may be configured to continually (when powered on) or intermittently (when powered on) determine a location of the first protective covering 100. The first protective covering 100 may be associated with the article 140 (e.g., in a database stored in the controller, the computer, or another electronic component) while the first protective covering 100 is coupled to the article 140. When the first protective covering 100 is coupled to the article 140, a location of the article 140 may be determined based on the location of the first protective covering 100. Accordingly, the location unit 154 may be used to determine a location of the article 140.

The first electronics 147 and the second electronics may further include a transmitter. For example, the first electronics 147 may include transmitter 148 to transmit the proximity data, the impact information, the location information, or a combination thereof, to a computer (e.g., the computer 404 in FIG. 4). As examples, the proximity data, the impact information, the location information, or a combination thereof, may be transmitted via a wi-fi network or another wireless data communication connection. The computer may process the proximity data, the impact information, the location information, or a combination thereof, as described in more detail with reference to FIG. 4. The first electronics 147 and the second electronics may also be configured to transmit information identifying the article 140 or the first protective covering 100.

Figure 2:
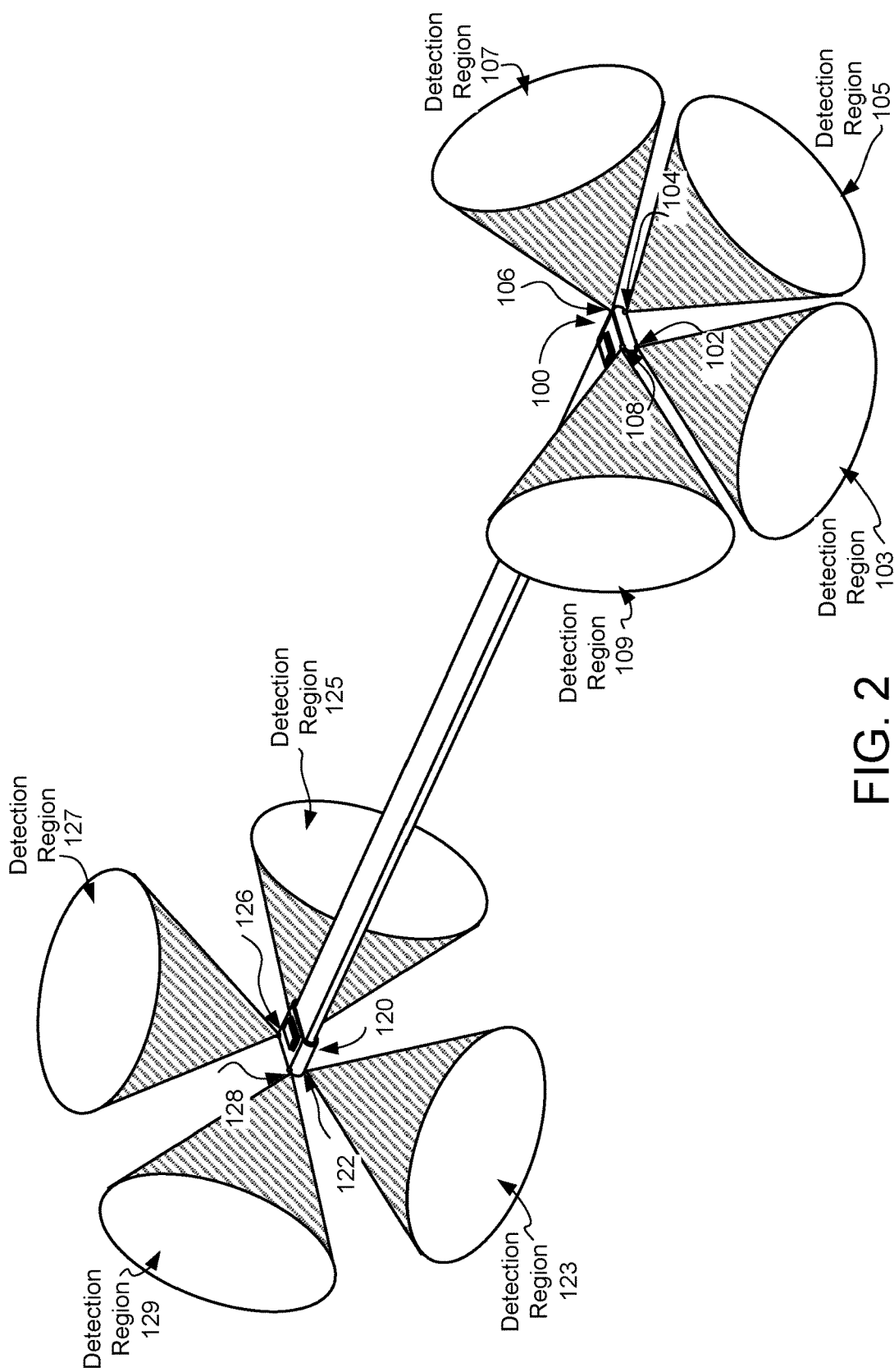
FIG. 2 is an illustration of particular detection regions of the particular embodiment of protective coverings of FIG. 1 when detachably coupled to the particular article of FIG. 1.

Referring to FIG. 2, particular examples of detection regions of one or more proximity sensors are depicted. Detection regions 103, 105, 107, and 109 correspond to detection regions of the first proximity sensors 102, 104, 106, and 108, respectively. Detection regions 123, 127, 129, and 125 correspond to detection regions of the second proximity sensors (e.g., the second proximity sensors 122, 126, 128, and the other sensor, respectively). As illustrated in FIG. 2, each of the detection regions 103, 105, 107, and 109 may not be co-planar with any other of the detection regions 103, 105, 107, and 109. In some embodiments, a composite detection region of the first proximity sensors 102, 104, 106, and 108 is substantially hemispherical. Thus, the first proximity sensors 102, 104, 106, and 108 may collectively enable detection of an object located in any portion of a substantially hemispherical region around a first end of the article 140. Alternatively or additionally, a composite detection region of the second proximity sensors (122, 126, 128, and the other sensor) may be substantially hemispherical. Thus, the second proximity sensors (122, 126, 128, and the other sensor) may collectively enable detection of an object located in any portion of a substantially hemispherical region around a second end of the article 140.

Figure 3:
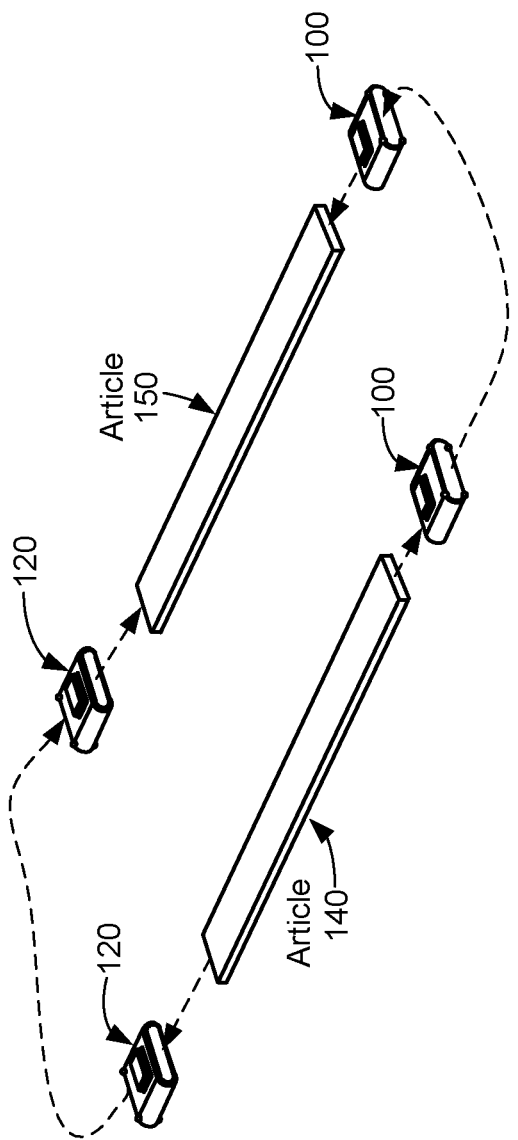
FIG. 3 illustrates removing the particular embodiment of protective coverings from the article of FIG. 1 and detachably coupling the protective coverings to a second particular article.

FIG. 3 depicts the one or more protective coverings 100, 120 being de-coupled from the article 140 (e.g., a first article) and depicts the one or more protective coverings 100, 120 being detachably coupled to a second article 150. The second article 150 may be an article that is similar to the first article 140. For example, the second article 150 may include a part, component, or material of a helicopter rotor, such as a rotor body, a rotor blade, or a combination or portion thereof. The second article 150 may be a similar type of article as the first article 140, but may be used during manufacturing, production, or assembly of a part, component, or device that is different than the part, component, or device with which the first article 140 is intended to be used. For example, when the first article 140 is intended for use in connection with manufacturing, production, or assembly of a rotor of a first type of helicopter, the second article 150 may be intended for use in connection with manufacturing, production, or assembly of a rotor of a second type of helicopter. The one or more protective coverings 100, 120 may be removed by a user, by a machine (such as a robotic or otherwise automated manufacturing or production tool), or both.

Figure 4:
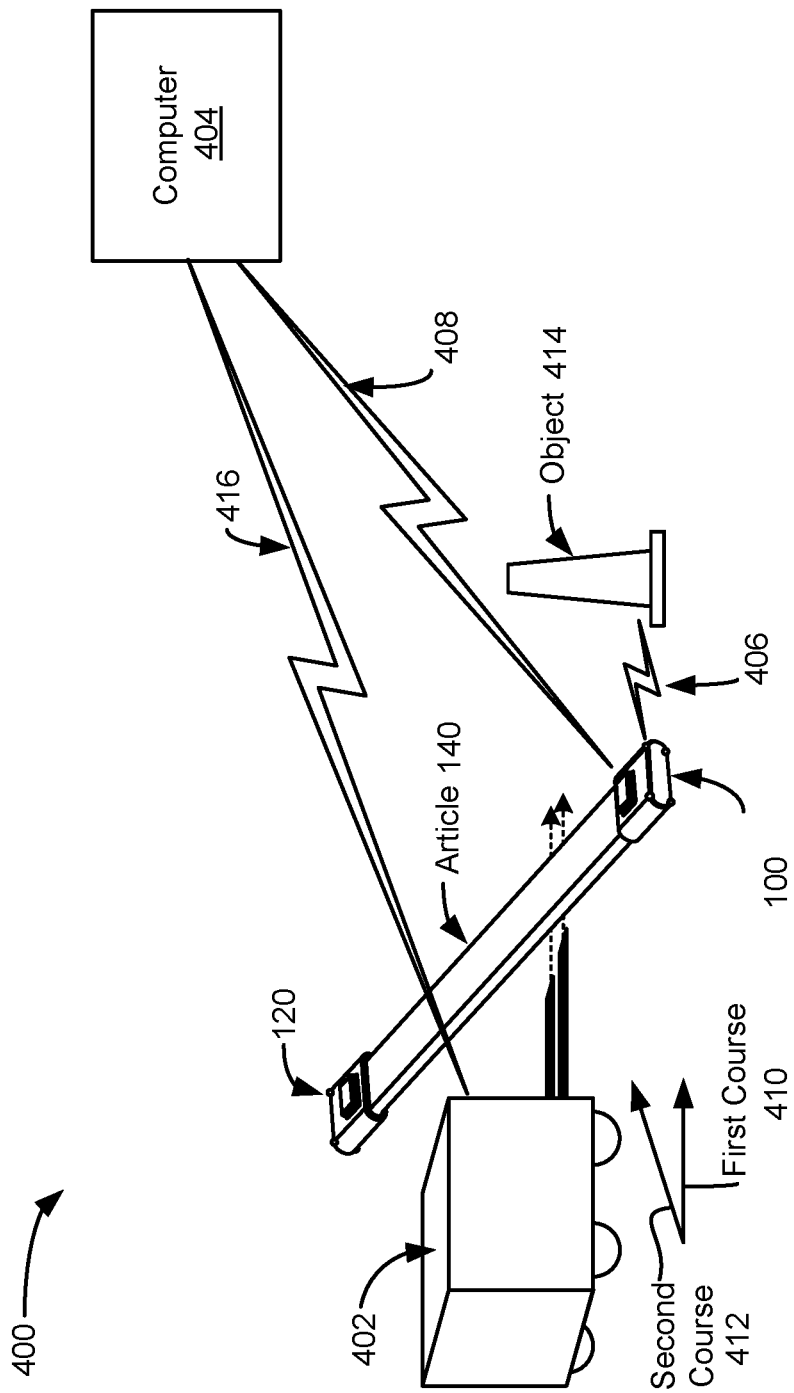
FIG. 4 illustrates a particular embodiment of an automated system that employs the particular embodiment of the protective coverings of FIG. 1.

With reference to FIG. 4, a particular example of an automated system employing the one or more protective coverings 100, 120 is generally illustrated and depicted as 400. The system 400 may be used during manufacturing, production, or assembly of a device or machine. For example, the system 400 may be used during manufacturing, production, or assembly of an aerial vehicle, or a portion of the aerial vehicle.

The automated system 400 may include a transportation device 402. The transportation device 402 may be a crane, a robotic manufacturing tool, an automated vehicle (such as an automated cart or an automated forklift), or another automated manufacturing or production tool or vehicle. The transportation device 402 may be configured to transport or move the article 140 from a first location to a second location during a production, manufacturing, or assembly process. For example, when the article 140 includes a part, component, or material of a helicopter rotor, such as a rotor body, a rotor blade, or a combination or portion thereof, the transportation device 402 may be configured to transport the article 140 from the first location to the second location during manufacturing, production, or assembly of the helicopter rotor. The transportation device 402 may include a control system configured to control a course (e.g., direction or velocity) of the transportation device 402 or to stop the transportation device's 402 motion. For example, the transportation device 402 may include a control system configured to apply a brake in response to receiving a control signal indicative of a possible or imminent collision with an object 414.

The one or more protective coverings 100, 120 may include a transmitter (e.g., the transmitter 148 of FIG. 1) to transmit the proximity information, the location information, the impact information, or a combination thereof, via a wireless connection to a computer 404, as described above. For example, the first protective covering 100 may determine a proximity to the object 414 as described above and may transmit proximity information 408 indicative of the determined proximity to the computer 404.

The computer 404 may be configured to evaluate the received proximity information and to determine whether to alter the course of movement of the transportation device 402 from a first course 410 to a second course 412. Alternatively or additionally, the computer 404 may be configured to evaluate the proximity information and to determine whether to stop (e.g., temporarily) movement of the transportation device 402. For example, the computer 404 may determine (e.g., based on the proximity information 408 transmitted from the first protective covering 100) that the article 140 will likely experience a collision with the object 414 unless the course of the transportation device 402 is adjusted or movement of the transportation device 402 is stopped. In response to determining that the collision is likely (e.g., imminent), the computer 404 may be configured to determine how to respond to determining that the collision is likely. For example, the computer 404 may be configured to determine whether to stop the transportation device 402. Alternatively or additionally, the computer 404 may be configured to determine whether to alter the course of movement of the transportation device 402 (e.g., to the second course 412).

The computer 404 may initiate transmission of a control signal 416 to the transportation device 402. The control signal 416 may be indicative of the response determined by the computer 404 based on the proximity information. For example, the control signal 416 may include an instruction to stop movement of the transportation device 402 or to alter the course of the transportation device 402. The transportation device 402 may be configured to receive the control signal 416 at the control unit. The control unit may process the received signal to determine the instruction. The control unit may then alter the course of the transportation device 402 or stop the transportation device 402.

Figure 5:
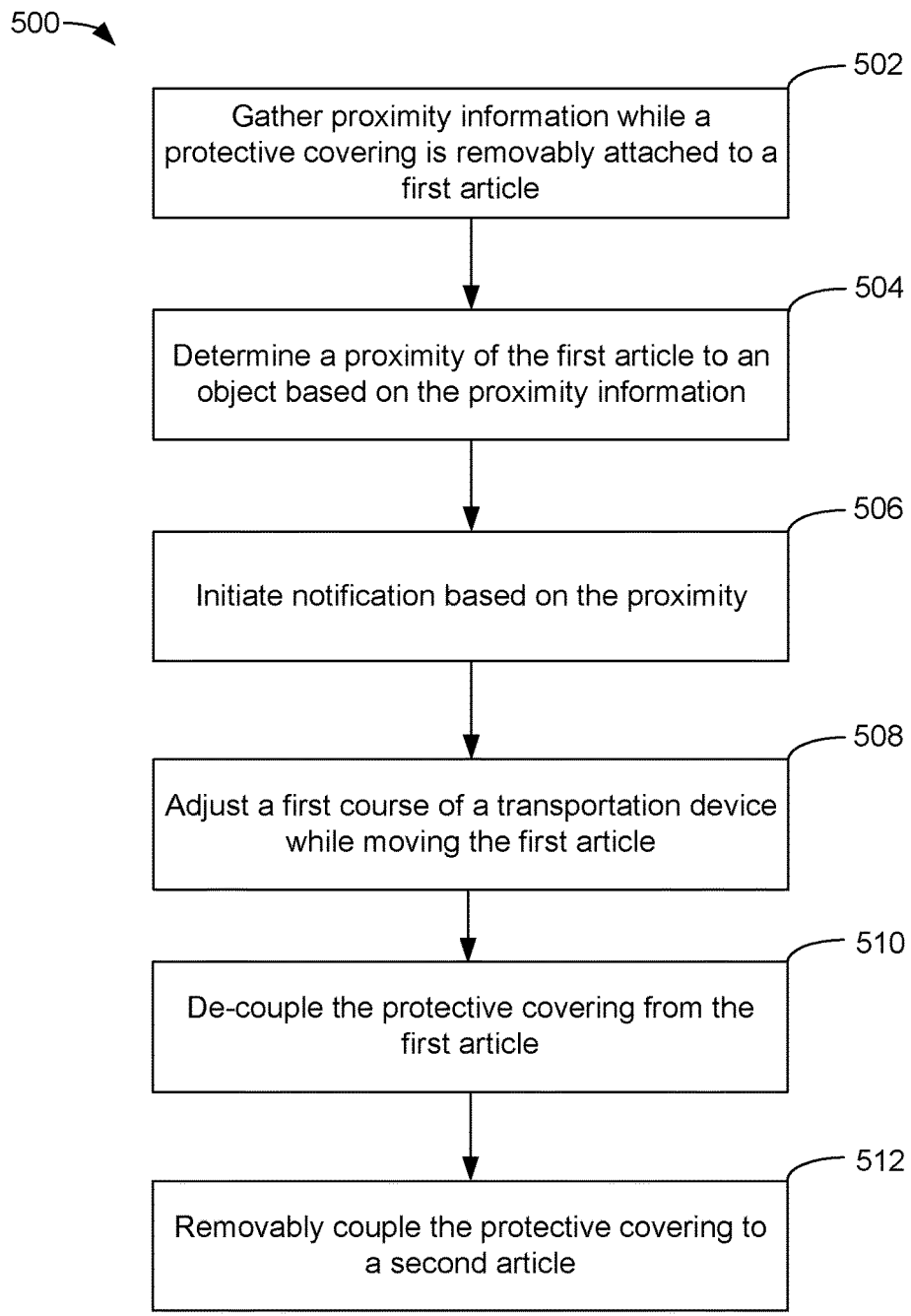
FIG. 5 is a flow chart of a method of protecting an article.

Referring to FIG. 5, a flow chart of a particular embodiment of a method 500 is depicted. The method 500 may be performed using the one or more protective coverings 100, 120 of FIGS. 1-4. The method 500 includes, at 502, while a protective covering is detachably coupled to a first article, gathering proximity information using sensors coupled to the protective covering and using electronics embedded in the protective covering. For example, with reference to FIG. 3, while the first protective covering 100 is detachably coupled to the article 140, the first protective covering 100 may gather proximity information (e.g., first proximity information) using the first proximity sensors 102, 104, 106, and 108, as described above. Alternatively or additionally, while the second protective covering 120 is detachably coupled to the article 140, the second protective covering 120 may gather proximity information (e.g., second proximity information) using the second proximity sensors 122, 126, 128, and the other sensor.

The method 500 includes determining, at 504, a proximity of the first article to an object based on the proximity information. For example, the first electronics 147 embedded in the first protective covering 100 may determine a range or proximity to an object based on the first proximity information as described above. Alternatively or additionally, the second electronics embedded in the second protective covering 120 may determine a range or proximity to the object (or to a different object) based on the second proximity information as described above.

The method 500 includes initiating, at 506, a notification based on the determined proximity. For example, the first electronics 147 embedded in the first protective covering 100 may include a notification unit 146 that initiates an audible, visible, or haptic notification based on the determined proximity as described above. The first electronics 147 may include a transmitter (e.g., 148 of FIG. 1), and initiating the notification may include transmitting the determined proximity or the notification information to a computer (e.g., the computer 404 of FIG. 4) using the transmitter 148 of FIG. 1.

The first protective covering 100 may include an impact sensor, a location unit, or both, as described above. For example, the first protective covering 100 may include the impact sensor 152, the location unit 154, or both. A transmitter (e.g., the transmitter 148 of FIG. 1) may be configured to transmit impact information from the impact sensor 152, location information from the location unit 154, or both, to the computer 404 of FIG. 4.

The method 500 may further include adjusting, at 508, a first course (e.g., the first course 410 of FIG. 4) of a transportation device (e.g., the transportation device 402) while moving the article 140. The first course 410 may be adjusted based on the proximity information gathered while the first protective covering is detachably coupled to the article 140. For example, the computer 404 may be configured to determine how to respond to proximity information that indicates a collision with the object 414 will likely occur unless the first course 410 is adjusted or the transportation device 402 is stopped. The computer 404 may transmit a control signal (e.g., the control signal 416) to the transportation device 402. The transportation device 402 may adjust the first course 410 to a second course 412 in response to receiving the control signal 416 from the computer 404. Adjusting the first course 410 or stopping the transportation device 402 may prevent collision of the article 140 with the object 414. Thus, the method 500 may protect the article 140 by preventing a collision with an object that may damage the article 140. The method 500 may further include de-coupling, at 510, the one or more protective coverings 100, 120 from the article 140, as described above with reference to FIG. 3. The method 500 may further include detachably coupling, at 512, the one or more protective coverings 100, 120 to the second article 150, as described with reference to FIG. 3. The method 500 may further include transporting the second article 150 (e.g., using the transportation device 402 or another transportation device) while the first protective covering 100 and the second protective covering 120 are removably coupled to the second article 150. The method 500 may further include adjusting a course of a transportation device (e.g., the transportation device 402 or another transportation device) during transportation of the second article 150 as described above with reference to course adjustment during transportation of the first article 140. The first protective covering 100 and/or the second protective covering 120 may subsequently be de-coupled from the second article 150, removably coupled to another article (e.g., a third article [not illustrated]), and used to adjust a course during transportation of the other article as described above with reference to the first article 140. Thus, the method 500 may enable the one or more protective coverings 100, 120 to be used to protect multiple articles.

Figure 6:
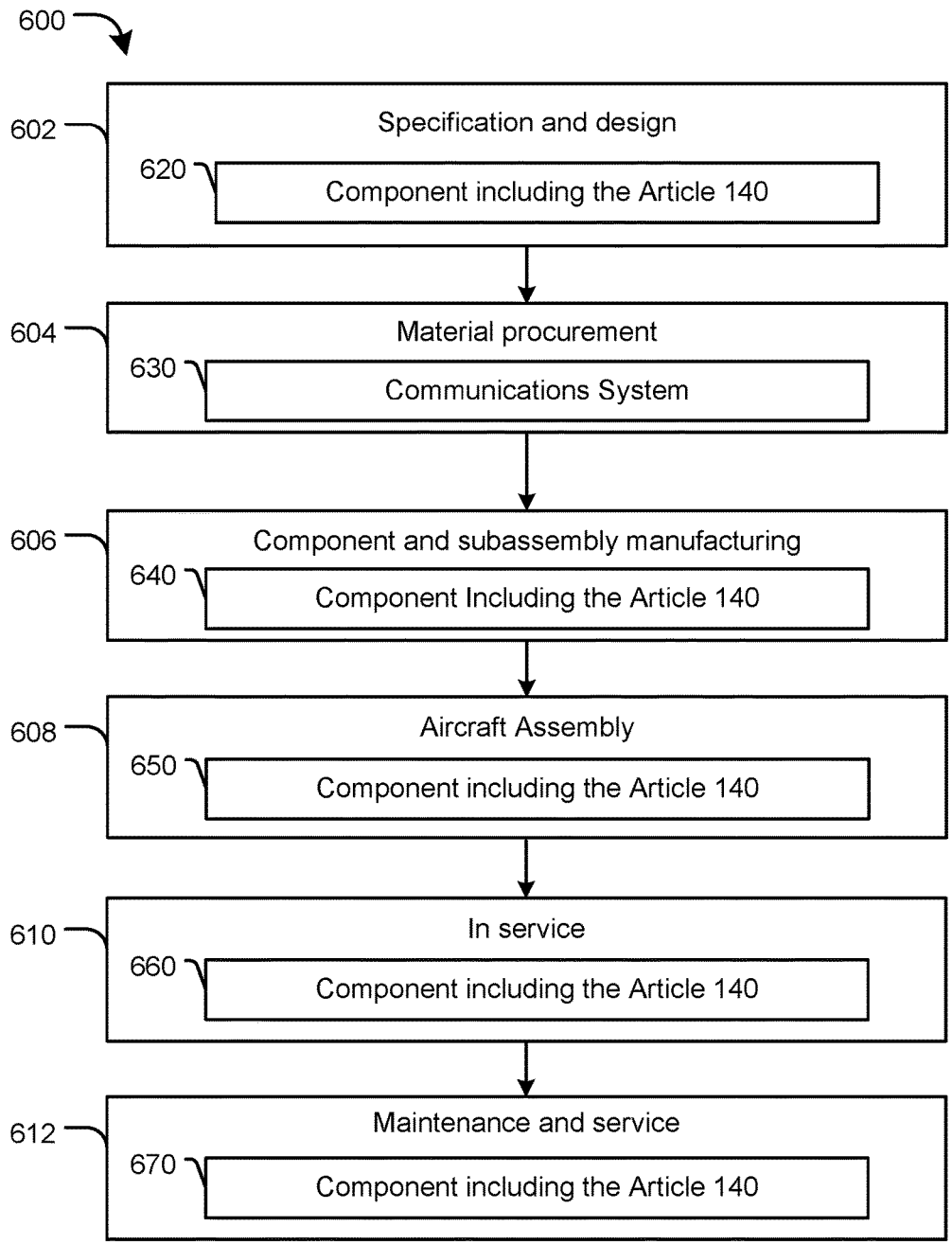
FIG. 6 is a flowchart illustrative of a life cycle of an aircraft that includes the article of FIG. 1.

Referring to FIG. 6, a flowchart illustrative of a life cycle of an aircraft that includes the article 140 of FIG. 1 is shown and designated 600. During pre-production, the exemplary method 600 includes, at 602, specification and design of an aircraft, such as a helicopter or an airplane. During specification and design of the aircraft, the method 600 may include, at 620, specification and design of a helicopter rotor (or other aircraft component) corresponding to the article 140 of FIG. 1. At 604, the method 600 includes material procurement. At 630, the method 600 includes procuring materials (e.g., rotor body material, rotor blade material, etc.) for the aircraft.

During production, the method 600 includes, at 606, component and subassembly manufacturing. The method 600 may include, at 640, component and subassembly manufacturing of a component of the aircraft (such as a helicopter rotor) that includes the article 140 of FIG. 1. During the component and subassembly manufacturing (e.g., during a transportation step of the manufacturing process), the one or more protective coverings 100, 120 may be detachably coupled to the article 140 used to produce or manufacture the component. For example, the article 140 may be a rotor body used to produce or manufacture the helicopter rotor. The one or more protective coverings 100, 120 may be detachably coupled to the article 140 when transporting the article 140 from a first station in a manufacturing chain to a second station in the manufacturing chain. The one or more protective coverings 100, 120 may be removed from the article 140 upon transporting the article 140 to the second station in the manufacturing station, and prior to assembly of the component that includes the article 140.

The method 600 may include, at 608, assembly of the aircraft. During assembly of the aircraft, the method 600 may include, at 650, coupling the component including the article 140 to another component of the aircraft. For example, the component including the article 140 may be coupled to an airframe or a body of a helicopter. The one or more protective coverings 100, 120 may be removed from the article 140 during assembly of the aircraft (e.g., after the component subassembly manufacturing of 606). Alternatively, the one or more protective coverings 100, 120 may be removed from the article 140 upon or after assembly of the aircraft. At 610, the method 600 includes placing the aircraft in service. For example, at 660, the method 600 may include placing an aircraft that includes the component that includes article 140 into service. The one or more protective coverings 100, 120 may not be coupled to the article 140 while the aircraft is in service. While in service by a customer, the aircraft including the component may be scheduled for routine maintenance and service (which may also include modification, reconfiguration, refurbishment, and so on). At 612, the method 600 includes performing maintenance and service on the aircraft. At 670, the method 600 includes performing maintenance and service on the component that includes the article 140. During servicing of the component that includes the article 140, the one or more protective coverings 100, 120 (or one or more other protective coverings that are produced or operate as described with reference to the one or more protective coverings 100, 120) may be detachably coupled to the article 140 and removed from the article 140. Each of the processes of the method 600 may be performed or carried out by an automated manufacturing tool, a third party, and/or an operator (e.g., a customer).

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A method, comprising:
   while a protective covering is detachably coupled to and is conformed to a first article, gathering proximity information by proximity sensors coupled to the protective covering and by using electronics embedded in the protective covering;
   determining, by a controller, a proximity of the first article to an object based on the proximity information; and
   outputting, by the controller, a notification based on the proximity.

2. The method of claim 1, further comprising:
   removing the protective covering from the first article; and
   detachably coupling the protective covering to a second article, wherein the protective covering is detachably coupled to the second article using a clip, a clamp, or a magnet.

3. The method of claim 1, wherein initiating the notification includes initiating an audible notification, a visual notification, a haptic notification, or a combination thereof.

4. The method of claim 1, wherein initiating the notification comprises, while the protective covering is detachably coupled to the first article, transmitting one or more signals corresponding to proximity information to a computer, and further comprising, responsive to a control signal received from the computer, adjusting a first course of a transportation device, the transportation device moving the first article and the adjusting based on the proximity information.

5. The method of claim 1, wherein the gathering of the proximity information includes receiving, by the proximity sensors, a signal, the signal being one of an electrical signal, an acoustic, and an electromagnetic signal.

6. The method of claim 3, wherein, when the notification is the audible notification, an adjustment based on the proximity is applied to the notification, the adjustment corresponding to a modification of: a pitch, a first frequency, a first duration, or a combination thereof.

7. The method of claim 3, wherein, when the notification is the visual notification, an adjustment based on the proximity is applied to the notification, the adjustment corresponding to a modification of: a color, a first intensity, a second frequency, a second duration, or a combination thereof.

8. The method of claim 3, wherein, when the notification is the haptic notification, an adjustment based on the proximity is applied to the notification, the adjustment corresponding to a modification of: a second intensity, a third frequency, a third duration, or a combination thereof.

9. The method of claim 1, wherein the gathering of the proximity information by the proximity sensors, includes receiving, wirelessly, from a transmitter, a signal, the transmitter remote from the protective covering.

10. The method of claim 1, wherein the notification is indicative of a collision between the article and the object.

11. The method of claim 10, further comprising storing at a memory, by the controller, impact information corresponding to the collision.

12. The method of claim 2, further comprising:
    gathering second proximity information by the proximity sensors and by the electronics;
    determining, by the controller, a second proximity of the second article to another object based on the second proximity information; and
    outputting, by the controller, a second notification based on the second proximity.

13. A method comprising:
    at a hazard detection device including a protective covering, a plurality of proximity sensors coupled to the protective covering, and electronics embedded in the protective covering, the electronics including a controller coupled to the plurality of proximity sensors, performing:
      while the protective covering is detachably coupled to and is conformed to an article:
        generating, by a first proximity sensor of the plurality of proximity sensors, first proximity data; and
        generating, by a second proximity sensor of the plurality of proximity sensors, second proximity data;
      receiving, at the controller, proximity information from the plurality of proximity sensors, the proximity information including the first proximity data and the second proximity data;

determining, at the controller, a proximity of the article to an object based on the proximity information; and outputting, by the controller, a notification based on the proximity.

14. The method of claim 13, further comprising receiving, by the first proximity sensor, a first signal, the first signal based on the object being positioned in a detection region of the first proximity sensor.

15. The method of claim 14, wherein the first signal is received from a transmitter external to the protective covering.

16. The method of claim 14, further comprising emitting, by the first proximity sensor, a second signal, the second signal reflected or diffracted from the object, wherein the generation of the first proximity data is based on a return signal, the return signal corresponding to a reflected or a diffracted portion of the second signal.

17. The method of claim 16, wherein the first signal and the second signal are one of a sonic signal or an electromagnetic signal.

18. The method of claim 13, further comprising comparing, by the controller, the proximity to a threshold, wherein the notification is output based on the proximity satisfying the threshold.

19. The method of claim 13, wherein the proximity is divided into a first proximity and into a second proximity, and further comprising adjusting, by the controller, at least one characteristic of a plurality of characteristics of the notification, wherein the notification is outputted based on the first proximity satisfying a first threshold, and wherein, during the outputting of the notification, the at least one characteristic is adjusted based on the second proximity satisfying a second threshold.

20. A non-transitory computer readable storage device storing instructions that, when executed by a controller of a protective covering, cause the controller to perform operations including:

while the protective covering is detachably coupled to and is conformed to an article, cause one or more proximity sensors to gather proximity information, the one or more proximity sensors coupled to the protective covering and to electronics, and the electronics embedded in the protective covering;

determine a proximity of the article to an object based on the proximity information; and output a notification based on the proximity.

\* \* \* \* \*